(12) United States Patent
Rabroker et al.

(10) Patent No.: US 11,517,831 B2
(45) Date of Patent: Dec. 6, 2022

(54) ABATEMENT SYSTEM FOR PYROPHORIC CHEMICALS AND METHOD OF USE

(71) Applicants: George Andrew Rabroker, Dallas, TX (US); Michael Carleton Murphey, Dallas, TX (US)

(72) Inventors: George Andrew Rabroker, Dallas, TX (US); Michael Carleton Murphey, Dallas, TX (US)

(*) Notice: Subject to any disclaimer, the term of this patent is extended or adjusted under 35 U.S.C. 154(b) by 744 days.

(21) Appl. No.: 16/452,179

(22) Filed: Jun. 25, 2019

(65) Prior Publication Data
US 2020/0406162 A1 Dec. 31, 2020

(51) Int. Cl.
| | |
|---|---|
| *B01D 1/14* | (2006.01) |
| *B01D 1/00* | (2006.01) |
| *B01D 53/78* | (2006.01) |
| *B01J 19/00* | (2006.01) |

(52) U.S. Cl.
CPC .............. *B01D 1/14* (2013.01); *B01D 1/0082* (2013.01); *B01D 53/78* (2013.01); *B01J 19/0006* (2013.01); *B01D 2258/0216* (2013.01)

(58) Field of Classification Search
CPC ........ B01D 1/0082; B01D 1/14; B01D 53/78; B01D 2258/0216; B01J 19/0006
See application file for complete search history.

(56) References Cited

U.S. PATENT DOCUMENTS

| | | | |
|---|---|---|---|
| 6,315,960 B1 * | 11/2001 | Shiban ................. | B01J 19/24 422/171 |
| 6,350,427 B1 | 2/2002 | Yuill et al. | |
| 6,689,930 B1 | 2/2004 | Pang et al. | |
| 7,534,399 B2 * | 5/2009 | Shiban ................. | B01D 53/70 422/177 |
| 7,682,574 B2 * | 3/2010 | Chiu ..................... | F23N 5/242 422/235 |
| 9,649,592 B2 * | 5/2017 | Cox ...................... | B01D 53/64 |
| 10,449,486 B2 * | 10/2019 | Cox ...................... | B01D 53/32 |
| 11,185,815 B2 * | 11/2021 | Cox ...................... | H01J 37/321 |
| 2003/0057576 A1 | 3/2003 | Tong et al. | |
| 2005/0066894 A1 | 3/2005 | Nelson | |
| 2007/0299385 A1 | 12/2007 | Santini et al. | |
| 2008/0032502 A1 | 2/2008 | Baskin et al. | |
| 2010/0008838 A1 * | 1/2010 | Fox ...................... | B01D 53/005 422/111 |
| 2010/0097205 A1 | 4/2010 | Script | |
| 2010/0119984 A1 * | 5/2010 | Fox ...................... | B01D 53/38 431/114 |
| 2013/0174602 A1 | 7/2013 | Bloom | |

(Continued)

OTHER PUBLICATIONS

PCT International Search Report and Written Opinion, from related international application No. PCT/US19/51689, dated Dec. 4, 2019, 11 pages.

*Primary Examiner* — Jonathan Miller (74) *Attorney, Agent, or Firm* — Law Office of Jeff Williams PLLC; J. Oliver Williams (57) ABSTRACT

An abatement system for pyrophoric chemicals where the materials are captured or controlled by a hazard volume and fed to a vaporizer in an oxygen deprived environment. Materials are heated until vaporized while mixed with nitrogen. The mixture exits the system through a reaction column. The system is monitored by oxygen sensors, smoke detectors and temperature sensors.

19 Claims, 8 Drawing Sheets

(56) References Cited

U.S. PATENT DOCUMENTS

2015/0251133 A1* 9/2015 Cox ................... B01D 53/64
423/210
2017/0268338 A1 9/2017 Qin et al.

* cited by examiner

ABATEMENT SYSTEM FOR PYROPHORIC CHEMICALS AND METHOD OF USE

BACKGROUND

1. Field of the Invention

The present invention relates generally to safety systems for unstable materials, and more specifically, to an abatement system for pyrophoric chemicals that prevents fire, allows for the safe and controlled reaction of leaked material and allows for its safe removal from the area where it is located.

2. Description of Related Art

Safety systems for unstable materials are well known in the art and are effective means to mitigate the damage that an unplanned reaction has on surrounding equipment, people or processes. Pyrophoric materials are used in semiconductor manufacturing and other industries that benefit from the chemical reactions and other processes they enable. Pyrophoric materials spontaneously ignite upon contact with oxygen and/or water making an accidental spill or leak of these materials extremely dangerous.

One of the problems commonly associated with pyrophoric materials is their limited efficiency and safety. For example, unintended spills or leaks from storage or process equipment result in fire damage to property and possible injury to personnel. The risks are compounded in semiconductor applications because any egress of airborne products of combustion compromise air quality requirements in such facilities and can cause prolonged losses of production to complete cleanup.

Accordingly, although great strides have been made in the area of safety systems for unstable materials, many shortcomings remain.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems or risks commonly associated with conventional safety systems for unstable materials. Specifically, the invention of the present application prevents combustion of leaked pyrophoric materials and allows for the abatement and disposal of the byproducts of the reaction. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be used independently or be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Figure 1:
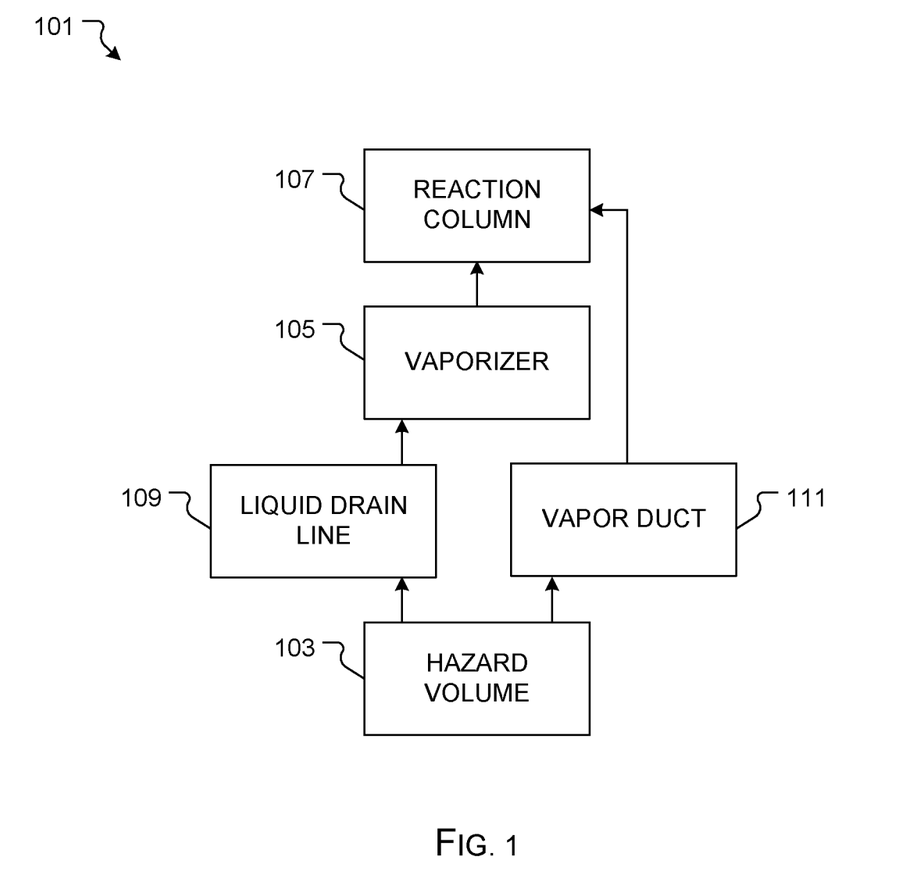
FIG. 1 is a diagram of an abatement system for pyrophoric chemicals in accordance with a preferred embodiment of the present application.
Figure 2:
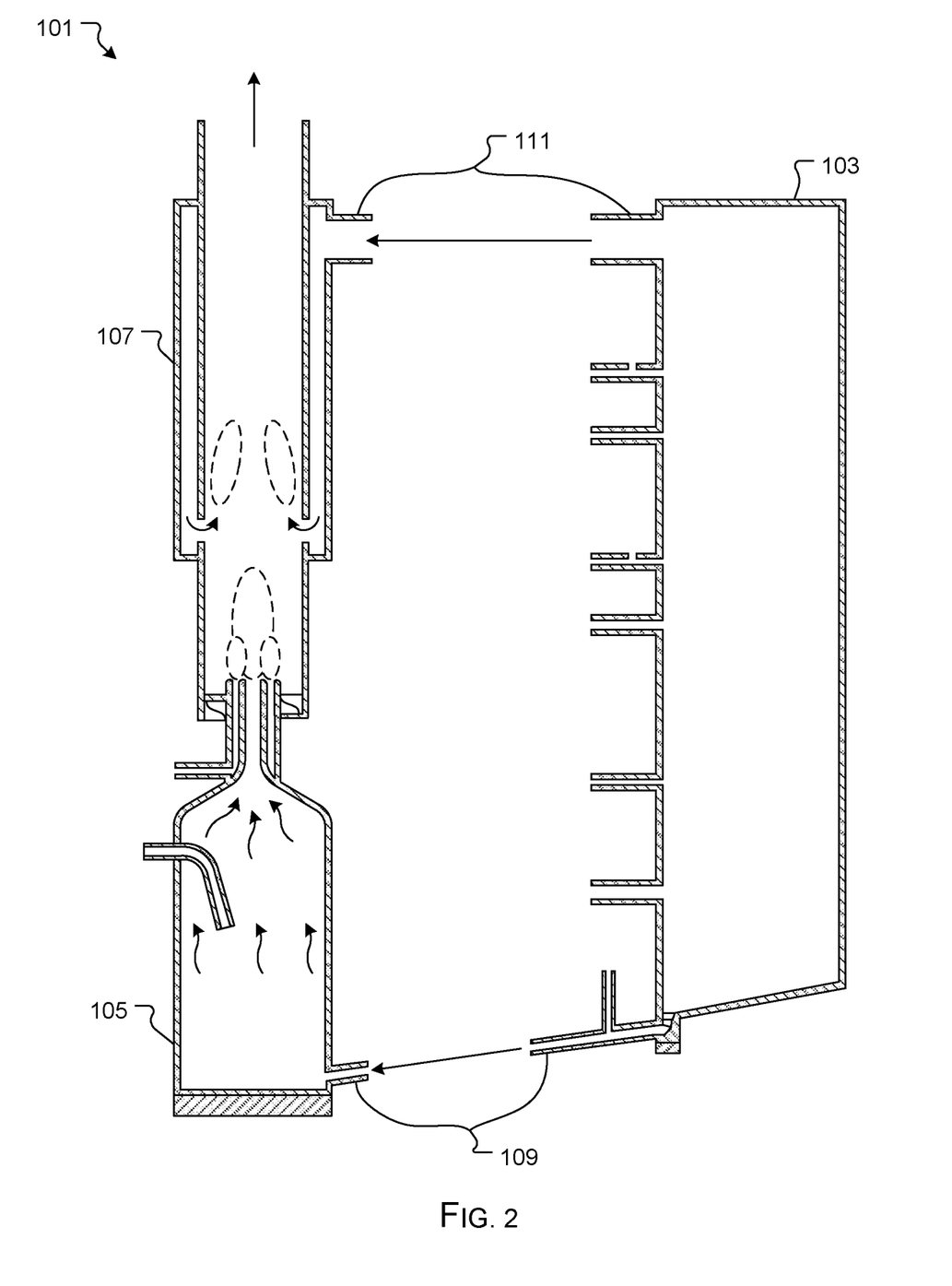
FIG. 2 is a cross-sectional front view of the preferred embodiment of FIG. 1.

Referring now to the drawings wherein like reference characters identify corresponding or similar elements throughout the several views, FIGS. 1 and 2 depict a diagram and a cross-sectional front view of a pyrophoric abatement system in accordance with a preferred embodiment of the present application, respectively. It will be appreciated that system 101 overcomes one or more of the above-listed problems or risks commonly associated with conventional unstable material control systems.

In the contemplated embodiment, system 101 includes a hazard volume 103 configured to hold pyrophoric materials in fluid communication with a vaporizer 105 via a liquid drain line 109 or other such passageway. The system 101 further includes a reaction column 107 in fluid communication with the vaporizer 105 and with the hazard volume 103 via a vapor duct 111 or other such passageway.

Figure 3:
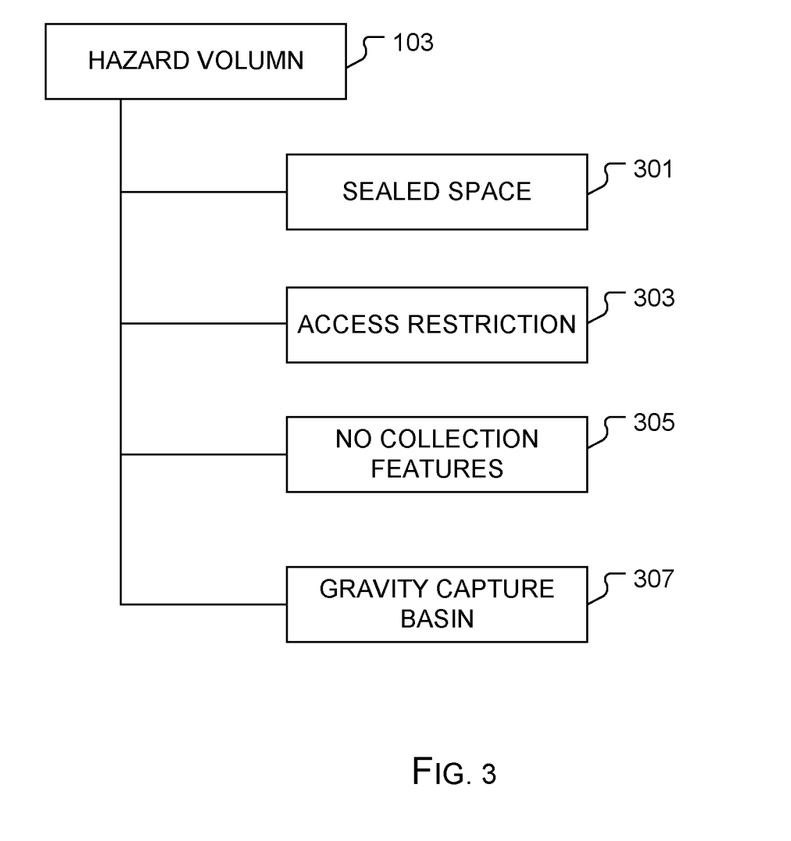
FIG. 3 is a simplified schematic of the hazard volume of FIG. 1.

Referring now to FIG. 3, the features of the hazard volume 103 are depicted. It is contemplated that the hazard volume 103 is a container, chamber, compartment or any other space such as a cabinet, that is able to be sealed 301 or otherwise configured to create a closed system. The hazard volume 103 restricts access 303 to the sealed space 301. In this way, the hazard volume 103 may be maintained slightly below ambient pressure by means of the fluid communication between the vapor duct 111 and the reaction column 107 which is in fluid communication with an exhaust suction system.

The hazard volume 103 further includes a gravity capture basin 307 for collecting any leaked pyrophoric material. The ideal configuration of the hazard volume 103 minimizes all potential collection features 305 such as pooling locations, absorbent materials, enclosed sub-volumes, narrow passageways, or any other surface or feature where liquid may find purchase or vapor may avoid effective purging and the like, aside from the gravity capture basin 307.

Figure 4:
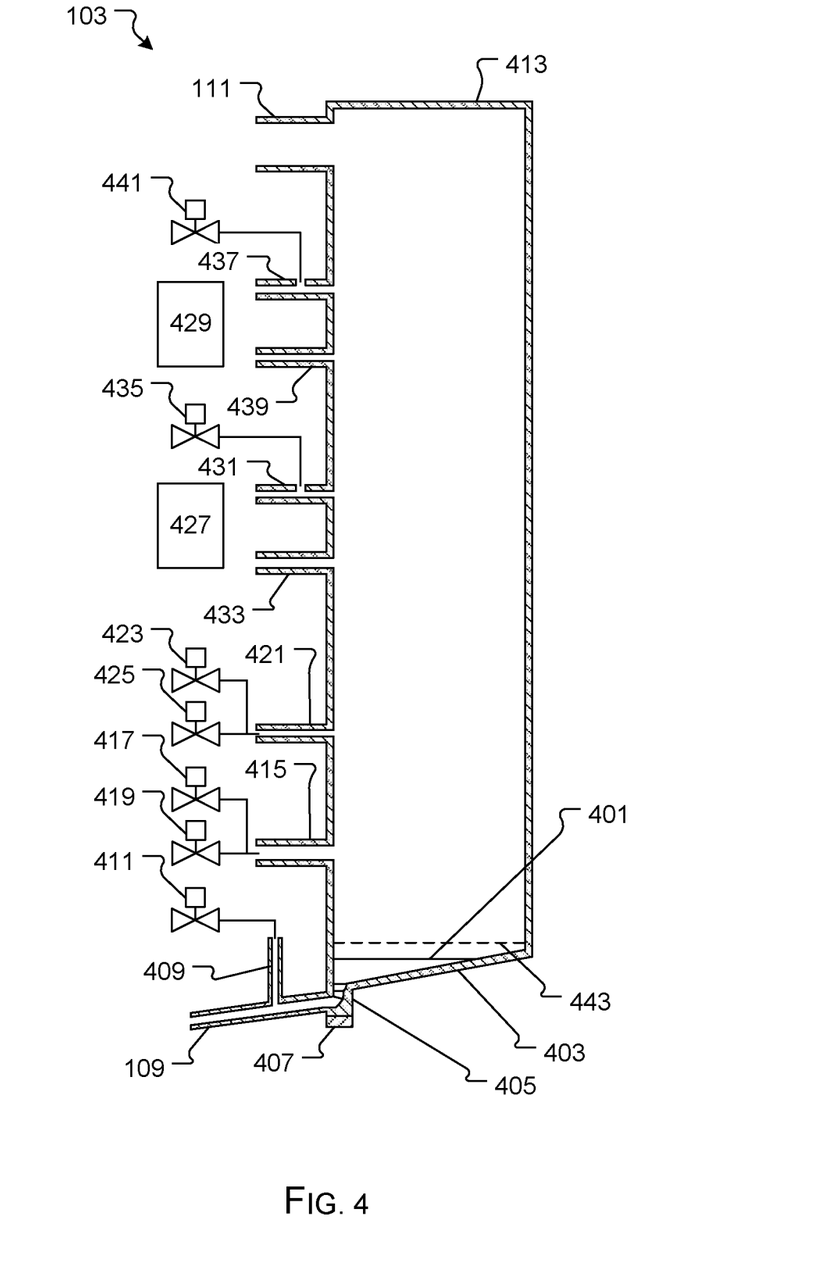
FIG. 4 is a cross-sectional front view of the preferred embodiment of the hazard volume of FIG. 1.

In the preferred embodiment depicted by FIG. 4, the hazard volume 103 is cabinet 413 configured such that leaked pyrophoric liquid 401 falls to a sloped basin 403 and collects in a sump block 405 equipped with a sump heater 407. Control of the sump heater 407 is facilitated by a sump temperature sensor 445. A sump purge port 409 connected to the liquid drain line 109 allows the liquid drain line 109 to be cleared of oxygen and moisture by purging with facility nitrogen through sump purge valve 411. The sloped basin 403 is configured to hold an amount of leaked pyrophoric liquid 401 up to a hazard volume containment level 443.

In the preferred embodiment any pyrophoric liquid 401 leaked in the hazard volume 103 is collected and maintained in the sloped basin 403 until the sump purge valve 411 is turned off. When the sump purge valve 411 is turned off, the pyrophoric liquid 401 is conveyed to the vaporizer 105 through the liquid drain line 109 by gravity.

There are at least two sources of nitrogen introduction and at least two sources of ambient air introduction into the hazard volume 103. The primary source of nitrogen introduction is supplied through the high flow port 415 via a high flow nitrogen valve 417. The flow capacity of the high flow nitrogen valve 417 is chosen to quickly and completely purge the hazard volume 103 of ambient air after closing any access doors/ports.

The primary means of ambient air introduction is supplied through the high flow port 415 by a high flow air valve 419. The flow capacity of the high flow air valve 419 is chosen to quickly and completely restore atmospheric oxygen levels to the hazard volume 103 prior to the opening of any access doors/ports to prevent the exposure of a human operator to an oxygen-deficient environment within the hazard volume 103. All gas constituents introduced in the hazard volume 103 by the high flow nitrogen valve 417 and the high flow air valve 419 exit through the vapor duct 111.

The secondary source of nitrogen introduction is supplied through the low flow port 421 by the low flow nitrogen valve 423. The secondary source of ambient air introduction is supplied through the low flow port 421 by the trim air valve 425. The flow capacities of the low flow nitrogen valve 423 and the trim air valve 425 are chosen to slowly change the oxygen/nitrogen ratio within the hazard volume 103. All gas constituents introduced in the hazard volume 130 by the low flow nitrogen valve 423 and the trim air valve 425 exit through the vapor duct 111.

Any pyrophoric material leak inside the hazard volume 103 is prevented from igniting by maintaining the oxygen concentration at a low level. To facilitate leak detection, the oxygen concentration should not be zero. An $O_2$ sensor (oxygen concentration sensor) 427 is configured to provide feedback data used in algorithms to control the low flow nitrogen valve 423 and the trim air valve 425 to achieve and maintain a target oxygen concentration that is low enough to prevent fire but high enough to result in low-energy reaction sufficient to generate reaction products within the sensing range an HSSD (high sensitivity smoke detector) 429.

The $O_2$ sample analyzed in the $O_2$ sensor 427 is drawn from the hazard volume 103 through the $O_2$ sensor sample port 431 and returned through the $O_2$ sensor return port 433. The $O_2$ sensor 427 may be guarded against excessive contamination by pyrophoric chemical vapors via a nitrogen purge through the $O_2$ sensor purge valve 435.

The HSSD (high sensitivity smoke detector) sample analyzed in the HSSD 429 is drawn from the hazard volume 103 through the HSSD sample port 437 and returned through the HSSD return port 439. The HSSD 429 may be guarded against excessive contamination by pyrophoric chemical vapors via a nitrogen purge through the HSSD purge valve 441.

Figure 5:
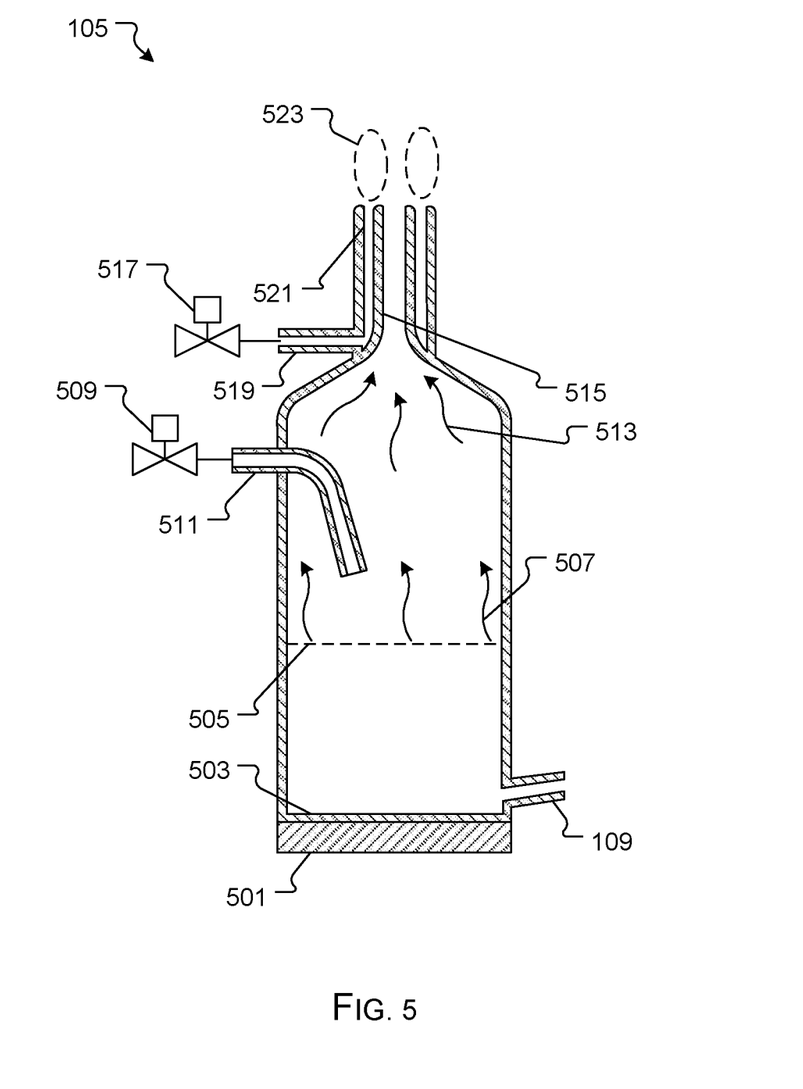
FIG. 5 is a cross-sectional front view of the preferred embodiment of the vaporizer of FIG. 1.

Referring now to FIG. 5 the preferred embodiment of the vaporizer 105 is depicted. The vaporizer 105 is sized such that the maximum leak capacity available within the hazard volume 103 is accommodated by the combination of containment in the hazard volume 103 under the hazard volume liquid containment level 443 (see FIG. 4) and the volume in the vaporizer 105 under a vaporizer liquid containment level 505.

In the preferred embodiment the leaked pyrophoric liquid 401 entering the vaporizer 105 from the hazard volume 103 through the liquid drain line 109 is collected then heated by a vaporizer heater 501 that generates pyrophoric vapor 507. The vaporizer heater 501 is controlled using feedback from the vaporizer temperature sensor 503 embedded in the base of the vaporizer 105. In conjunction with the heating, purge nitrogen is introduced to the vaporizer 105 volume by the vaporizer purge valve 509 and enters through the vaporizer purge tube 511. The vaporizer purge nitrogen and pyrophoric vapor 507 mix and converge at the vaporizer head 513 and exit to the reaction column 107 through the nozzle 515. Throughout the vaporization process, shroud nitrogen enters the shroud port 519 that has been allowed to flow through the shroud valve 517. This shroud gas flows through the shroud annulus 521 and forms an annular inert shroud 523 around the pyrophoric vapor 507 exiting the nozzle 515.

It will be understood that some unstable chemicals or pyrophoric materials require other conditions to safely control their vaporization rate. It is thus contemplated that the vaporizer will take on such environmental inputs to control the combustion or vaporization of said chemicals or materials. Specifically it is contemplated that the system could function without a vaporizer or where the vaporizer heater is replaced with a vaporizer cooler.

Figure 6:
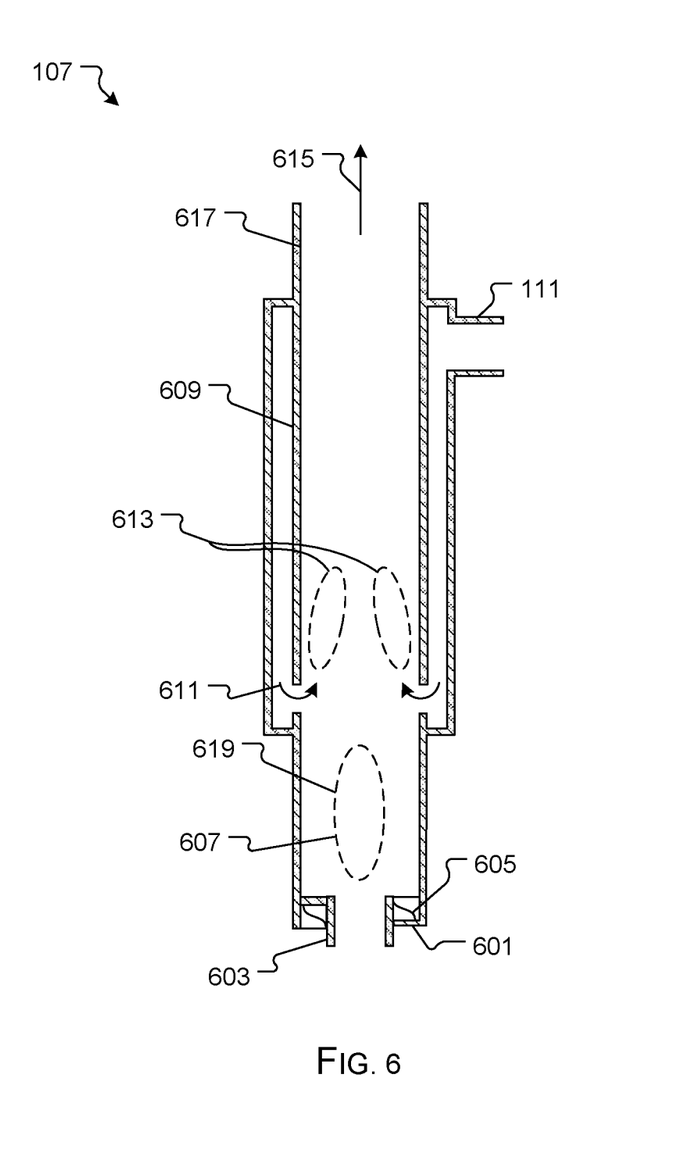
FIG. 6 is a cross-sectional front view of the preferred embodiment of the reaction column of FIG. 1.

Referring now to FIG. 6 the preferred embodiment of the reaction column 107 is depicted. The vapors exiting the vaporizer 105 and vapors exiting the hazard volume 103 through the vapor duct 111 enter the reaction column 107. All pyrophoric vapors entering the reaction column are fully reacted, or abated, using ambient air. The top of the reaction column 107 is configured to be in fluid communication with an exhaust outlet, such as a facility or building exhaust suction device. The ambient abatement air drawn through the air inlet annulus 601 passes the ambient temperature sensor 603 before passing across the swirl vanes 605.

The swirl vanes 605 impart rotational velocity to the abatement air which imparts the same to all other vapors entering the reaction column 107. Rotation of the flow within the reaction column 107 acts to stabilize the process lending to a well-mixed and axisymmetric reaction that discourages the solids generated in these types of reactions from adhering to component surfaces. Abatement air first contacts pyrophoric vapor and begins the abatement reaction at the initiation site 607 after breaking through the annular inert shroud 523 (see FIG. 5). The reaction between pyrophoric materials and air result in solid byproducts which are blocked from depositing on the nozzle 515 or shroud annulus 521 because the reaction is initiated above these components due to the inert shroud 523.

Constant or varying amounts of abatement air vastly in excess of the stoichiometric amount required to react the pyrophoric vapor 507 can be caused to flow through the reaction column 107 to thermally dilute the reaction process and ensure complete reaction of pyrophoric vapors 507. In this manner, excess air is present for the remainder of the reaction to be completed upon pyrophoric vapors 621 exiting the hazard volume 103 through the vapor duct 111, traveling down the coaxial duct 609 and entering the reaction area through annular ports 611.

Pyrophoric vapors 621 passing through the annular ports 611 mix and react with the abatement air in the secondary abatement region 613. The resulting products of the reaction in the primary abatement region 619 and the secondary abatement region 613 constitute the exit gas 615 which is fully reacted and relatively cool due to thermal dilution with the excess abatement air drawn into the reaction column 107. Data from the exit temperature sensor 617 is used as a secondary method to limit the heat input to liquid pyrophoric material within the vaporizer 105.

Figure 7:
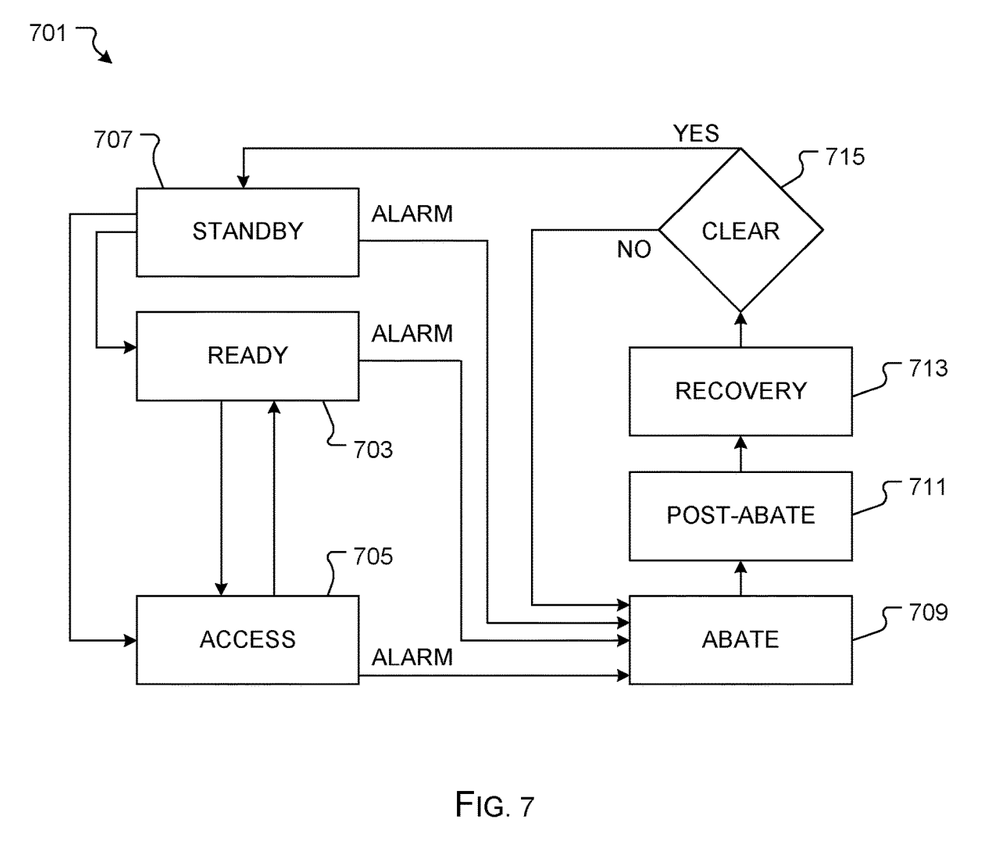
FIG. 7 is a diagram of the control process including the sequence for abating pyrophoric materials in the system of FIG. 1.

Referring now to FIG. 7 the control process 701 of the preferred embodiment of the present invention is depicted. Process 701 includes a ready state 703 wherein the system 101 is prepared to conduct normal procedures for the use of the pyrophoric material therein and an access state 705 for purposes of opening the hazard volume 103. An alarm can be initiated by the HSSD 429, an unexpected thermal response in the reaction column 107 that causes the temperature measured at the exit temperature sensor 617 to rise above the temperature measured at the ambient temperature 603, or by manual activation. An alarm from any control state sends the system 101 to the abate state 709. Once the abate state 709 is entered conditions within the system 101 are monitored and when no reaction is believed to be therein the abate state 709 moves to a post-abate state 711 and then to a recovery state 713. The system 101 is checked, if clear 715 transitions to the standby state 707 and if not, it returns to the abate state 709. An access state 705 can be reached from the ready state 703 or the standby state 707 wherein the hazard volume 103 is allowed to open. The abate state 709, post-abate state 711, recovery state 713 and clear 715 check combine to form the abate sequence.

The purpose of the ready state 703 is to close and secure the hazard volume 103 and achieve a target $O_2$ concentration therein. The target $O_2$ concentration for a given configuration can be tailored to the specific pyrophoric chemistry present within the hazard volume 103, but is chosen to satisfy the following conditions: 1) low enough to eliminate the possibility of pyrophoric material ignition thereby preventing fire damage to any component(s) within the hazard volume 103, and 2) not equal to zero so that a minimum amount of reaction products are produced to activate the HSSD 429 in the event of a pyrophoric chemical leak.

The ready state 703 is typically entered from the access state 705 after the hazard volume 103 has been opened. The ready state control algorithm may first ensure that certain conditions are met, e.g. doors closed and locked. The control routine then forces the $O_2$ concentration within the hazard volume 103 to the target by first operating the high flow nitrogen valve. As the $O_2$ concentration decreases, the low flow nitrogen valve and trim air valve are used to achieve and maintain the target $O_2$ concentration.

While in the ready state 703, the sump purge valve 411 is always open to ensure that the liquid drain line 109 is completely free of oxygen so that a pyrophoric chemical leak that quickly reaches the sump cannot react within it causing solid deposits that may obstruct flow to the vaporizer 105. The HSSD 429 is continuously monitored by the system 101.

The abate state 709 is responsible for the initial response to a detected leak of pyrophoric material and its ultimate abatement reaction. Once an alarm is generated, it is of utility to protect certain sensors from unnecessary exposure to pyrophoric chemical vapors until needed in subsequent control states. The $O_2$ sensor purge valve 435 is therefore opened to overcome the sample flow. The $O_2$ sensor purge completely flushes the $O_2$ sensor and exits into the hazard volume 103 through the $O_2$ sensor sample port 431 and $O_2$ sensor return port 433 preventing the ingress of pyrophoric material vapor. Similarly, after initial detection of reaction products, the HSSD 429 sample is of no utility and the device can be protected from pyrophoric vapor by opening the HSSD purge valve 441 causing purge gas to completely flush the HSSD 429 and exit into the hazard volume 103 through the HSSD sample port 437 and HSSD return port 439. The high flow nitrogen valve 417 is also opened immediately upon alarm to purge the hazard volume 103 of all remaining oxygen at the target concentration level and cease further reaction within the cabinet 413. As high flow nitrogen enters the cabinet 413, it displaces all oxygen, trace reaction products and pyrophoric chemical vapor. All displaced gaseous constituents are expelled to the reaction column 107 through the vapor duct 111. This nitrogen purging supplied by the high flow nitrogen valve 419 and/or the low flow nitrogen valve 423 may continue through the entire abate state 709.

The sump purge valve 411 may either be closed immediately upon alarm or maintained open until application-specific conditions are met. For example, the sump purge valve 411 may be held open while the vaporizer heater 501 works to achieve the desired vaporizer temperature set point. Closing the sump purge valve 411 allows leaked pyrophoric liquid 403 to drain to the vaporizer 105. When pyrophoric material liquid 403 enters the vaporizer 105, vapors 507 may be generated by one or both of two causes: 1) direct heat input from the vaporizer heater 501, and/or 2) evaporation by dry nitrogen introduced by the vaporizer purge valve 509. The pyrophoric vapor 507 and vaporizer purge nitrogen exit the vaporizer nozzle 515 and react with abatement air drawn through the reaction column 107. In conjunction with constant mass flow of abatement air through the reaction column 107, control of the vaporizer 105 allows the system to control the temperature rise in the reaction column 107.

The abate state 709 functions described above continue until leaked pyrophoric liquid 403 in the vaporizer 105 is fully processed. The depletion of pyrophoric liquid 403 in the vaporizer 105 can be detected by a thermal response in the reaction column 107. When the difference between the exit temperature sensor 617 and the ambient temperature sensor 603 trends towards zero, the pyrophoric material in the vaporizer 105 is assumed to be fully abated. This condition causes a transition to the post-abate state 711.

The purpose of the post-abate state 711 is to encourage full dissipation of all residual leaked pyrophoric material before any reintroduction of oxygen to the hazard volume 103. Although the material in the vaporizer 105 has been fully evaporated and abated, there remains the potential for residual liquid films on the inner walls of the liquid drain line 109, sump block 405 and possibly other surfaces within the hazard volume 103. The post-abate state 711 offers a time period to allow and facilitate the full evaporation of residual pyrophoric material from all surfaces within the system 101 and route the corresponding residual vapors to the reaction column 107.

The vaporizer heater 501 and vaporizer purge valve 509 remain active throughout the post-abate state 711. Additionally, the HSSD purge valve 441 and 02 sensor purge valve 435 remain open throughout the post-abate state 711. Further, the sump heater 407 is activated to achieve and maintain a desired temperature in the sump block 405 to encourage full evaporation from this lowest collection point in the hazard volume 103. The sump purge valve 411 is open throughout the post-abate state 711 to facilitate drying of the liquid line 109 and sump block 405. The post-abate state 711 is considered complete when certain preset time periods are complete. It is contemplated that while in the post-abate state 711 if the difference between the exit temperature sensor 617 and the ambient temperature sensor 603 exceeds a programmed threshold, the control may be configured to revert to the abate state 709.

The system 101 will enter the recovery state 713 upon completion of the post-abate state 711. The purpose of the recovery state 713 is to slowly reintroduce oxygen (ambient air) into the hazard volume 103 to verify the effectiveness of the post-abate process. During the recovery state 713, the $O_2$ sensor purge valve 435 and HSSD purge valve 441 are closed so that their respective devices resume sampling. The trim air valve 425 is controlled to slowly increase the oxygen concentration within the hazard volume 103.

If there remains any pyrophoric material in the hazard volume during the recovery state 713, it will begin to react as the oxygen concentration slowly ramps upward. These reaction products will be sensed by the HSSD 429 and cause a return to the abate state 709. Successful completion of the recovery state 713 includes an elevated oxygen concentration without the reactivation of the HSSD 429.

It is contemplated that it may be advantageous to implement a "safe" state in which the hazard volume 103 can be protected as it is in the ready state 703, but in a distinctly different control state. Because the present invention may be fully automated, the existence of this "safe" state is utilized to force a user to recognize that a pyrophoric leak has been detected and abated requiring a manual reset to unlatch a safety relay(s) associated with the alarm before return to normal operation in the ready state 703 or the access state 705. This "safe" state is the standby state 707 for purposes of describing the present invention. A user may acknowledge that an abate sequence has been experienced by activating an abate reset command.

It will be appreciated that the abatement sequence may be conducted multiple times through successive iterations or loops. These iterations may persist until a successful pass through the recovery state resulting in no HDDS 429 or thermally initiated return to the abate state 709. Iterations allow frequent checks for residual pyrophoric material as opposed to unnecessarily long time periods for evaporation during the post-abate state 711 before resuming normal operation.

Figure 8:
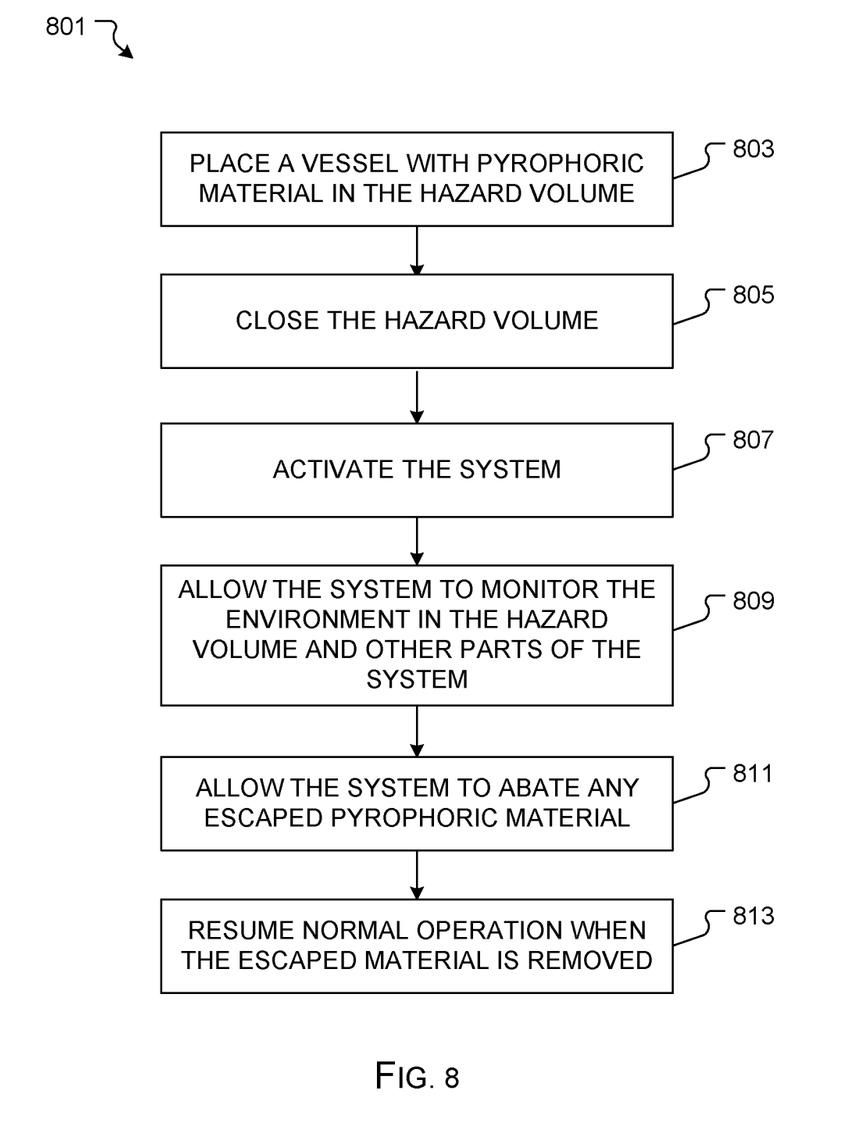
FIG. 8 is a flowchart of the preferred method of use of the system of FIG. 1.

Referring now to FIG. 8 the preferred method of use of the system 101 is depicted. Method 801 includes allowing access to the hazard volume for the addition or inspection of pyrophoric materials therein 803, closing and restricting access to the hazard volume 805, controlling the environment within the hazard volume to prevent excessive exothermic reaction of leaked pyrophoric material 807, allowing the system to monitor the environment in the hazard volume and other parts of the system for escaped pyrophoric material, its byproducts or other indicators constituting an alarm condition 809, allowing the system to abate any escaped pyrophoric material 811, removing the residual escaped pyrophoric material from the system 813, verifying the absence of the escaped pyrophoric materials 815, allowing access or transitioning from the abate sequence 817 and resuming normal operation when the escaped pyrophoric material is removed. 819.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, the invention is not limited to just these embodiments, but are amenable to various changes and modifications without departing from the spirit thereof.

What is claimed:

1. An abatement system for pyrophoric chemicals comprising:
    at least one hazard volume;
    at least one vaporizer;
    at least one reaction column; and
    at least one sensor configured to detect the presence of an unintended release of pyrophoric materials from the at least one hazard volume;
    wherein the at least one hazard volume, the at least one vaporizer and the at least one reaction column are in fluid communication with each other;
    wherein the at least one sensors are configured to initiate, cause to cease, and alter the operation of the system; and
    wherein pyrophoric material present in the hazard volume is prevented from combustion by means of inerting gas therein and is abated in an oxygen-controlled environment of the at least one reaction column.

2. The system of claim 1 wherein nitrogen gas is introduced therein to control the combustion of the pyrophoric material and wherein the rate of nitrogen introduction is at any rate via at least one port from at least one source.

3. The system of claim 1 wherein a passageway leading from the at least one hazard volume to the at least one vaporizer remains free of oxygen via at least one nitrogen gas source introducing nitrogen gas thereto.

4. The system of claim 3 wherein the pyrophoric materials are maintained in the at least one hazard chamber via the nitrogen gas introduced in the passageway.

5. The system of claim 1 wherein the at least one vaporizer comprises at least one means of heating and at least one means of cooling in thermal communication with the pyrophoric materials therein.

6. The system of claim 1 wherein the vapors moving from the at least one vaporizer to the at least one reaction column are shrouded by nitrogen gas introduced in proximity to the exit of the at least one vaporizer.

7. The system of claim 1 wherein the pyrophoric materials either in the at least one hazard volume, the at least one vaporizer or a passageway are heated such as by at least one vaporizer heater and at least one sump heater.

8. The system of claim 1 wherein nitrogen, heat and time are used to clear the system of the pyrophoric materials prior to reintroduction of oxygen thereto wherein the oxygen is reintroduced gradually to ensure the absence of pyrophoric materials.

9. The system of claim 1 wherein re-introduction of oxygen into the hazard volume after an abatement event is gradual to facilitate detection of low-level reaction products without the risk of flame or excessive exothermic reaction.

10. The system of claim 1 wherein the at least on reaction column includes swirl vanes configured to mix vapors and prevent the deposition of solid reaction products therein.

11. The system of claim 1 wherein the at least one sensor is restricted from sampling during an abate state and a post-abate state wherein excessive exposure to pyrophoric material is prevented.

12. The system of claim 1, comprising:
a ready state;
an access state; and
a standby state, each of the ready state, the access state and the standby state able to transition between an abate state by the signal of an alarm from a sensor in the system, the ready state and access state transition therebetween;
the abate state wherein leaked material is abated upon an alarm condition;
a post-abate state set for a duration of time to ensure that escaped pyrophoric materials have abated; and
a recovery state that begins to initialize the sensors in the system to ascertain the presence of uncontrolled pyrophoric material therein.

13. A method of abating spilled, escaped or otherwise uncontrolled pyrophoric materials given the system of claim 1, comprising:
allowing access to the hazard volume for the addition or inspection of pyrophoric materials therein;
closing and restricting access to the hazard volume;
controlling the environment within the hazard volume to prevent excessive exothermic reaction of leaked pyrophoric material;
allowing the system to monitor the environment in the hazard volume and other parts of the system for escaped pyrophoric material, its byproducts or other indicators constituting an alarm condition;
allowing the system to abate any escaped pyrophoric material;
removing the residual escaped pyrophoric material from the system;
verifying the absence of the escaped pyrophoric materials;
allowing access or transitioning from the abate sequence; and
resuming normal operation when the escaped pyrophoric material is removed.

14. An abatement system for pyrophoric chemicals comprising:
at least one hazard volume, the hazard volume comprising an enclosed space configured to reduce or eliminate potential collection features to facilitate the collection of pyrophoric liquid in at least one gravity capture basin;
at least one reaction column; and
at least one sensor configured to detect the presence of an unintended release of pyrophoric materials from the at least one hazard volume;
wherein the at least one hazard volume and the at least one reaction column are in fluid communication with each other;
wherein the at least one sensors initiate, cause to cease, and alter the operation of the system; and
wherein pyrophoric material present in the hazard volume is prevented from combustion therein and is abated in an oxygen-controlled environment of the at least one reaction column.

15. The system of claim 14 wherein nitrogen gas is introduced therein to control the combustion of the pyrophoric material and wherein the rate of nitrogen introduction is at any rate via at least one port from at least one source.

16. The system of claim 14 wherein a passageway leading from the at least one hazard volume to the at least one reaction column remains free of oxygen via at least one nitrogen gas source introducing nitrogen gas thereto.

17. The system of claim 14 wherein the at least one reaction column includes swirl vanes configured to mix the reaction and prevent the deposition of solid reaction products therein.

18. The system of claim 14 wherein the at least one senor is restricted from sampling during the abate state and post-abate state wherein excessive exposure to pyrophoric material is prevented.

19. The system of claim 14, comprising:
a ready state;
an access state; and
a standby state each of the ready state, the access state and the standby state able to transition between an abate state by the signal of an alarm from a sensor in the system, the ready state and access state transition therebetween;
the abate state wherein leaked material is abated upon an alarm condition;
a post-abate state set for a duration of time to ensure that escaped pyrophoric materials have abated; and
a recovery state that begins to initialize the sensors in the system to ascertain the presence of uncontrolled pyrophoric material therein.

* * * * *